April 1, 1952     G. O. CONNER     2,591,512
CLAMP
Filed Aug. 5, 1947
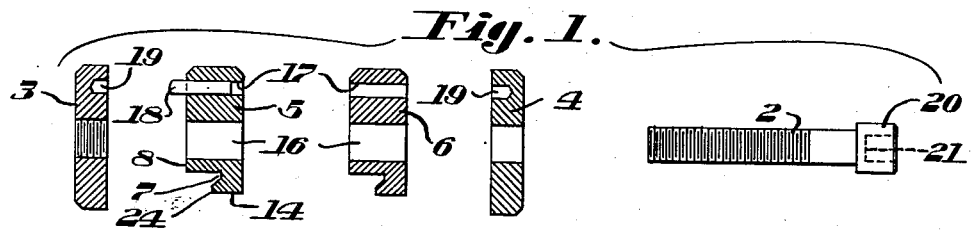
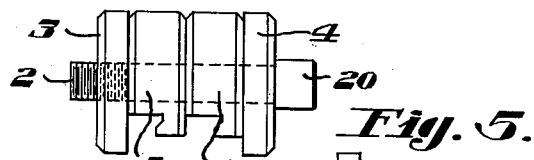
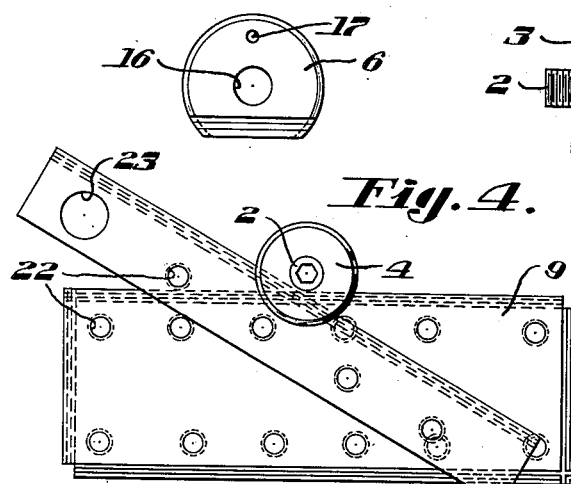
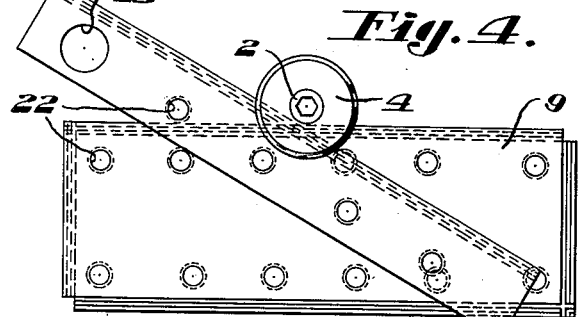
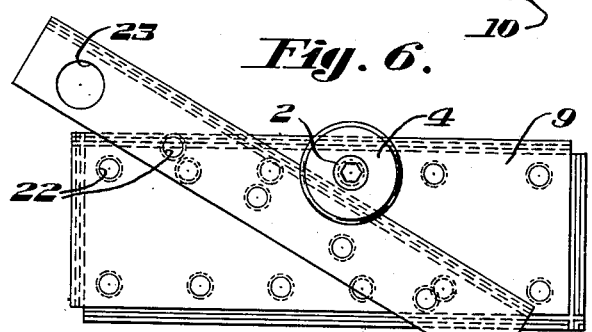
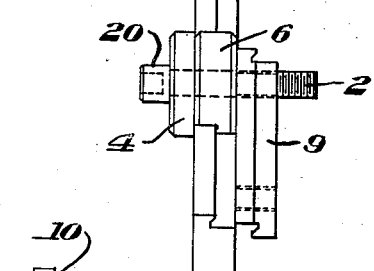
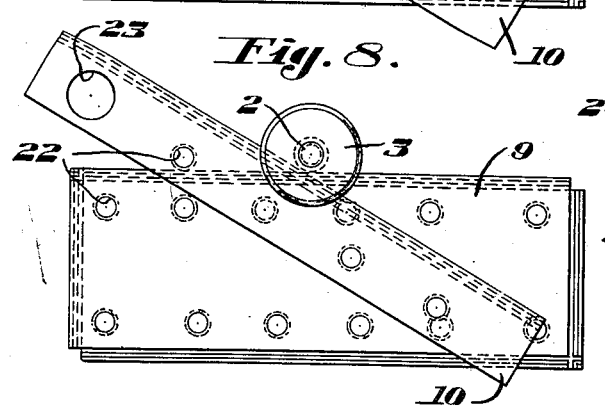
INVENTOR
GUY O. CONNER Patented Apr. 1, 1952

2,591,512

UNITED STATES PATENT OFFICE 2,591,512

CLAMP

Guy O. Conner, Cleveland Heights, Ohio

Application August 5, 1947, Serial No. 766,397

2 Claims. (Cl. 29—286)

This invention relates to clamps and particularly to clamps for fastening together structural members. It has to do especially with clamps for temporarily fastening together structural members and having provision for fastening together the structural members in a plurality of relative positions.

While my clamp is of general utility it is especially useful in clamping together structural members which may cooperatively form a template for use in positioning drill jig bushings, for laying out work or for other purposes. One form of template with which my clamp is of especial utility is disclosed in my copending application Serial No. 574,531, now Patent No. 2,548,197, issued April 10, 1951. In my said copending application there are disclosed cooperating template members each having a groove and a projection, the members being assemblable with the projection of each disposed in the groove of the other and being adapted to be held in thus assembled relationship by devices such as washers adapted to be fastened by screws to one of the cooperating template members and to overlap a portion of the other to hold the respective projections of those members in the respective grooves thereof.

When the template members disclosed in my said copending application are fastened together in the manner above described their relative angular position is fixed by the projections and grooves. My clamp enables fastening together of the template members in different relative angular positions; in fact, by use of my clamp the template members can be fastened together in any desired adjusted angular position.

Purely for purposes of explanation and illustration the invention will be described as embodied in a clamp which I call a spool clamp and which is especially adapted and intended for fastening together flanged members such as the template members above referred to. I provide a clamp comprising cooperating portions adapted to be disposed on opposite sides of a structure to be clamped, one of the portions containing a recess opening thereinto from a face of said portion adapted to be disposed next the structure to receive a projection on the structure, and means offset from the structure for holding the portions together in clamping relationship to the structure. When the clamp is for clamping a structural member having a footed flange (i. e., a flange having at its extremity a portion extending at an angle to the flange proper) to another member the recess preferably opens into the clamp portion from both of two intersecting faces, being desirably deeper in a direction generally parallel to one of those faces at a zone relatively remote from said face than at a zone relatively near said face, the recess thus being adapted to receive a footed flange or projection of the structural member.

One of the clamp portions preferably has a straight lateral edge, which portion contains a recess opening thereinto from a face of said portion adapted to be disposed next the structure to be clamped, said recess extending parallel to said straight lateral edge and being adapted to receive a flange on the structure while an edge of the structure lies against said straight lateral edge. The recess preferably opens into the clamp portion both from said straight lateral edge and from an adjacent face of said portion and extends parallel to said straight lateral edge and is desirably deeper in a direction generally normal to said face at a zone relatively remote from said straight lateral edge than at a zone relatively near said straight lateral edge so as to be adapted to receive a footed flange on the structure while an edge of the structure lies against said straight lateral edge. The clamp portions are fastened together so as to clamp the structure by means offset from the structure. Thus the structure need not be bored to receive any portion of the clamp. The holding means is preferably a bolt which passes through the clamp portions but not necessarily through the structure. A nut applied to the bolt enables drawing up of the clamp portions to clamp the structure.

The respective clamp portions are turnable about the axis of the bolt so that the members being clamped together may be disposed at any angle to one another. Such members may be disposed flush against each other or they may be spaced from one another axially of the bolt by disposing a spacing member or washer therebetween. In certain cases the clamp bolt may thread into one of the members being clamped together instead of having a nut applied to it.

Other details, objects and advantages of the invention will become apparent as the following description of a present preferred embodiment thereof proceeds.

In the accompanying drawings I have shown a present preferred embodiment of the invention, in which Figure 1 is an exploded axial cross-sectional view of one form of spool clamp showing the elements of the clamp in one relationship which they may assume in use but axially separated from one another;

Figure 2 is a face view of one of the clamp elements;

Figure 3 is a side view of the clamp elements shown in assembled relationship;

Figure 4 is a plan view showing two template members fastened together by the clamp;

Figure 5 is an end elevational view of the structure shown in Figure 4;

Figure 6 is a plan view showing two template members fastened together by the clamp with the clamp bolt threaded into one of the template members;

Figure 7 is an end elevational view of the structure shown in Figure 6;

Figure 8 is a plan view showing two template members fastened together by the clamp but in spaced apart relationship axially of the clamp bolt; and Figure 9 is an end elevational view of the structure shown in Figure 8.

Referring now more particularly to the drawings, my spool clamp in the form shown in Figures 1 to 5, inclusive, comprises a bolt 2, a nut 3 adapted to be threaded onto the bolt, a washer 4 and two members 5 and 6, each of which is circular in plan except that at one portion of its circumference it is shaped to present laterally a straight edge 24 having a conformation adapting it to interengage with a footed flange of a structural member. At the straight edge 24 of each of the members 5 and 6 there is a recess 7 which extends parallel to the edge 24 and which opens into the member 5 or 6 both from the edge 24 and from the adjacent face 8 of the member. The recess 7 is deeper in a direction generally normal to the face 8 at a zone relatively remote from the edge 24 than at a zone relatively near said edge as clearly shown in Figure 1. Thus the recess is adapted to receive a footed flange on a member to be clamped while an edge of that member lies against the edge 24.

There are shown in Figures 4 and 5 two template members designated generally by reference numerals 9 and 10, respectively, these template members having edge formations like those of the template members disclosed in my said copending application. Each of the template members 9 and 10 has at an edge thereof a flange 11 extending parallel to the edge and projecting therefrom generally parallel to the plane of the member, the flange 11 having at its extremity a foot 12 projecting transversely of the flange. The foot 12 is shown as being tapered from relatively great dimension where it joins the flange to relatively small dimension at its extremity. The recesses 7 in the clamp members 5 and 6 are each of substantially the same cross-section as the footed flange structure 11, 12 above described so that such footed flange structure may enter the recess with the face portion 13 of the member 9 or 10 lying flush against the outside face 14 of the member 5 or 6 at the straight edge 24 thereof. The face 15 of each template member away from which the foot 12 projects lies almost flush with the face 8 of the clamp member 5 or 6 but preferably projects a very small fraction of an inch, for example, .005", beyond the face 8 so that a cooperating member of the clamp may lie against the face 15 and thus tightly hold the flange structure 11, 12 in the recess 7. As shown in Figures 4 and 5 each of the template members 9 and 10 may thus cooperate with one of the clamp members 5 and 6. The clamp members 5 and 6 may be turned at any desired angle to one another whereby the template members can be clamped together at any desired angle to one another.

In the structure shown in Figures 4 and 5 the clamp member 5 is shown in interengagement with the template member 9 and the clamp member 6 is shown in interengagement with the template member 10. The clamp member 6 in this setup performs a dual function of receiving the template member 10 and backing up the template member 9 to maintain it in place with respect to the clamp member 5. The washer 4 is disposed against the head of the bolt 2 and backs up the template member 10 to maintain it in interengagement with the clamp member 6. The nut 3 is threaded onto the bolt to hold the various members in assembled relationship as shown. The washer 4 lies against the bolt head, the clamp member 6 lies against the washer 4, the clamp member 5 lies against the clamp member 6 and the nut 3 lies against the clamp member 5. In the drawings the overall thickness of each of the clamp members 5 and 6 is shown as being the same as the overall thickness of each of the template members 9 and 10 and this is substantially true, although, as above explained, in order to insure holding the flange of each template member firmly seated in the receiving recess of the corresponding clamp member the face of the template member away from which the foot 12 projects preferably lies a very small fraction of an inch above the corresponding face of the cooperating clamp member. Thus while in Figure 5 the clamp member 6 is shown as lying flush against the face 15 of the template member 9 and the corresponding face of the cooperating clamping member 5 the portion of the template member 9 which is engaged by the clamp member 6 is slightly compressed to insure its being held firmly in place. The same holds true of the relationship between the washer 4 and the template member 10.

Each of the clamp members 5 and 6 is shown as having in addition to its relatively large central bore 16 for receiving the bolt a relatively small eccentric bore 17 adapted to receive by a driven fit a pin 18 which when employed projects somewhat from the clamp member as shown in Figure 1. A pin is shown in place in the bore 17 of the clamp member 5 but no pin is shown in place in the corresponding bore of the clamp member 6. Each of the nut 3 and washer 4 is shown as provided with a socket 19 for receiving a pin 18 projecting from an adjacent clamp member such as the member 5. It will be understood that the various clamp members can be arranged in different cooperative relationships to meet different conditions, but in the relationship in which they are arranged in Figures 1 to 5, inclusive, the pin 18 in the clamp member 5 enters the socket 19 in the nut 3, thus preventing relative turning between the clamp member 5 and the nut 3. The head 20 of the bolt 2 is provided with a hexagonal socket 21 for receiving a wrench such as an Allen wrench for turning the bolt. As the bolt is being tightened up to assemble the clamp and template members the template members are relatively turned so as to be positioned in the desired angular position just before final tightening of the bolt and when the bolt is finally tightened the template members are maintained firmly but temporarily in adjusted position. The provision for preventing relative turning between the clamp member 5 and the nut 3 facilitates relative angular adjustment of the template members. The use of pins 18 and sockets 19 is not essential but considerably facilitates employment of the clamp.

Each of the template members 9 and 10 is provided with a plurality of threaded bores 22 and the template member 10 is provided with an opening 23 which may, for example, receive a drill jig bushing. In Figures 6 and 7 one of the threaded bores 22 of the template member 9 is utilized for receiving the clamp bolt thus enabling the nut 3 and one of the clamp members 5 and 6 to be dispensed with. In Figures 6 and 7 the clamp member 6 is shown in interengagement with the template member 10, the washer 4 maintaining that relationship, the bolt 2 passing through the washer 4 and the clamp member 6 and threading into one of the threaded bores 22 in the template member 9. Thus the template members 9 and 10 are maintained in substantially flush relationship to each other and in the desired angular relationship to each other without the necessity of using the clamp member 5 and the nut 3. This comes about because of the provision of the threaded bores 22 in the template members.

Figures 8 and 9 show the template members 9 and 10 fastened together by the spool clamp in the same way as in Figures 4 and 5 but in spaced apart relationship axially of the bolt. The clamp member 6 cooperates with the template member 10 and the clamp member 5 cooperates with the template member 9 as in Figures 4 and 5, but the washer 4 is positioned between the clamp members 5 and 6. The head 20 of the bolt 2 lies against the clamp member 5 and the nut 3 lies against the template member 10. The nut 3 thus cooperates with the clamp member 6 in clamping the template member 10 and the washer 4 cooperates with the clamp member 5 in clamping the template member 9. The template members are spaced apart axially of the bolt 2 by a distance equal to the thickness of the washer 4.

While I have shown and described a present preferred embodiment of the invention it is to be distinctly understood that the invention is not limited thereto but may be otherwise variously embodied within the scope of the following claims.

I claim:

1. A clamp comprising cooperating portions adapted to be disposed on opposite sides of a structure to be clamped, one of the portions having a straight lateral edge, said portion containing a recess opening thereinto both from said straight lateral edge and from an adjacent face of said portion, said recess extending parallel to said straight lateral edge and being deeper in a direction generally normal to said face at a zone relatively remote from said straight lateral edge than at a zone relatively near said straight lateral edge so as to be adapted to receive a footed flange on the structure while an edge of the structure lies against said straight lateral ledge, and means offset from the structure for holding the portions together in clamping relationship to the structure.

2. A clamp comprising a bolt, a collar disposed about the bolt, the collar having a straight lateral edge and containing a recess opening thereinto both from said straight lateral edge and from an adjacent face of the collar, said recess extending parallel to said straight lateral edge and being deeper in a direction generally normal to said face at a zone relatively remote from said straight lateral edge than at a zone relatively near said straight lateral edge so as to be adapted to receive a footed flange of a structure to be clamped while an edge of the structure lies against said straight lateral edge, and a second collar also disposed about the bolt and adapted to be tightened against the structure to clamp the structure between the collars.

GUY O. CONNER.

REFERENCES CITED

The following references are of record in the file of this patent:

UNITED STATES PATENTS

| Number | Name | Date |
| --- | --- | --- |
| 184,945 | Zeiker | Nov. 28, 1876 |
| 858,549 | West et al. | July 2, 1907 |
| 947,811 | Glidden | Feb. 1, 1910 |
| 1,443,752 | Lindmark | Jan. 30, 1923 |
| 1,575,314 | Bousquet | Mar. 2, 1926 |
| 1,665,877 | Fernald | Apr. 10, 1928 |
| 1,677,376 | Zilliox | July 17, 1928 |
| 1,840,470 | Schneider | Jan. 12, 1932 |
| 2,073,030 | Sefcik | Mar. 9, 1937 |
| 2,080,916 | Hayden | May 18, 1937 |
| 2,453,464 | Sheridan | Nov. 9, 1948 |
| 2,537,837 | Lambrozzi et al. | Jan. 9, 1951 |